United States Patent
Rasras

(10) Patent No.: US 7,257,291 B1
(45) Date of Patent: Aug. 14, 2007

(54) ULTRA-NARROW BANDPASS FILTER

(75) Inventor: Mahmoud Rasras, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/460,979

(22) Filed: Jul. 29, 2006

(51) Int. Cl.
*G02B 6/26* (2006.01)

(52) U.S. Cl. ............................. 385/27; 385/14; 385/32; 385/39

(58) Field of Classification Search ................... 385/14, 385/27, 32, 39
See application file for complete search history.

(56) References Cited

U.S. PATENT DOCUMENTS 6,748,142 B2 * 6/2004 Madsen ....................... 385/49

* cited by examiner

*Primary Examiner*—Frank G. Font
*Assistant Examiner*—Michael P. Mooney

(57) ABSTRACT

A passband filter exhibiting ultra-narrow characteristics comprising a cascaded pair of Mach-Zehnder (MZ) structures each including a plurality of resonators optically coupled to each of the arms of the MZ structures.

8 Claims, 4 Drawing Sheets

ULTRA-NARROW BANDPASS FILTER

FIELD OF THE INVENTION

This invention relates generally to the field of optical communications and in particular to narrow bandpass optical filters exhibiting improved characteristics.

BACKGROUND OF THE INVENTION

Optical bandpass filters which transmit a specific waveband of light have found wide application in a number of optical systems.

Optical bandpass filters constructed from waveguide grating routers—while offering useful narrow bandpass characteristics—are somewhat bulky, difficult to fabricate and consequently expensive.

Optical bandpass filters constructed from an all-pass filter and Mach-Zehnder structures are oftentimes too-sensitive to waveguide loss.

SUMMARY OF THE INVENTION

In accordance with the principles of the invention, an ultra-narrow bandpass filter is constructed from a two-stage all-pass filter arrangement having a Mach-Zehnder structure. More particularly, two pole/zero filters are cascaded such that desirable response characteristics are realized without the attendant loss which plagues the prior art.

Advantageously, the present invention constrains waveguide loss(es) in a single stage filter, significantly improves optical power throughput and resulting signal to noise ratio while permitting the implementation of a broad range of passband widths without introducing variations of the filter access loss or crosstalk associated with neighboring channels.

BRIEF DESCRIPTION OF THE DRAWING

In the drawing:

FIG. 5 shows a graph (4A) depicting the passband relative to the total passband of filter according to present invention; a more detailed graph (4B) depicting the narrow passband of the cascaded filter as related to component filters F1 and F2, and a block diagram (4C) showing the overall filter as a multiplication of filters F1×F2.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
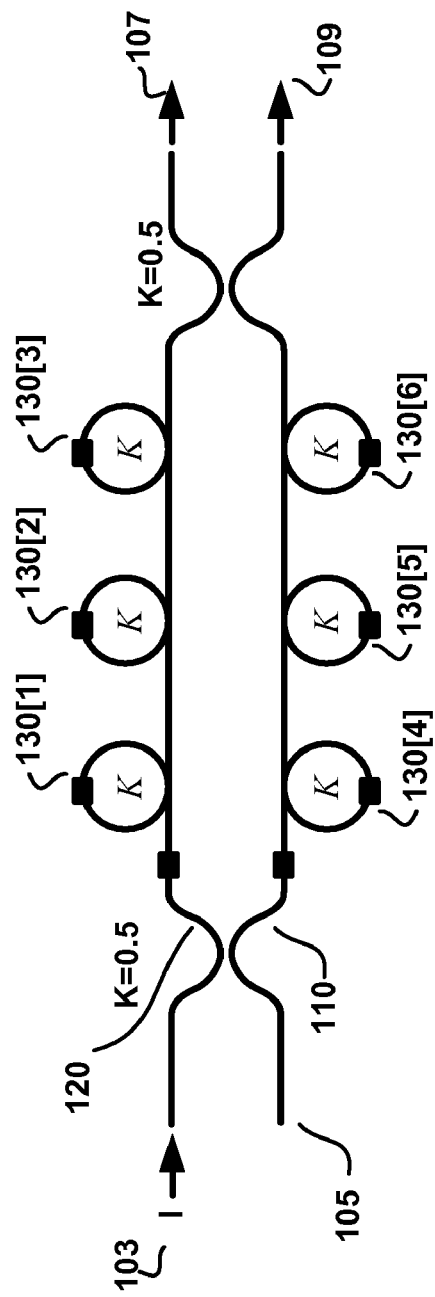
FIG. 1 is a schematic of a prior art $6^{th}$ order pole/zero filter.

FIG. 1 shows a schematic of an optical apparatus 100 which employs a structure known to those skilled in the art as a Mach-Zehnder structure. Mach-Zehnder structures are widely utilized in optical transmission systems and a number of types are known and understood.

With continued reference to that FIG. 1, it may be observed that the apparatus' structure includes one or more an input waveguides 103, 105 and one or more output waveguides 107, 109 optically connected by a pair of waveguide arms 110, and 120. Accordingly, an optical signal applied to an input waveguide will exit through an output waveguide after traversing the apparatus via upper arm 110 and/or lower arm 120.

Also shown in this FIG. 1, are a plurality of ring resonators 130[1] . . . 130[6], certain ones of which are optically coupled to either the upper arm 130 or the lower arm 140 of the apparatus.

At this point it should be noted that the resonator structures 130[1] . . . 130[6] are shown as being outside of the Mach-Zehnder structure. Those skilled in the art will appreciate that such resonators (either ring resonators or others) may be within the Mach-Zehnder structure(s) as well. For the purposes of the present invention, it is only required that such resonator structures be optically coupled to the Mach-Zehnder arms of the apparatus.

When configured in this manner, the apparatus depicted in FIG. 1 acts as a $6^{th}$ order pole/zero filter. This apparatus (filter) employs the resonators 130[1] . . . 130[6] to engineer the phase(es) in the arms 110, 120. Advantageously, such a filter may emulate the various passband characteristics of other known filter types, including Butterworth, Chebyshev, and Elliptical.

Figure 2:
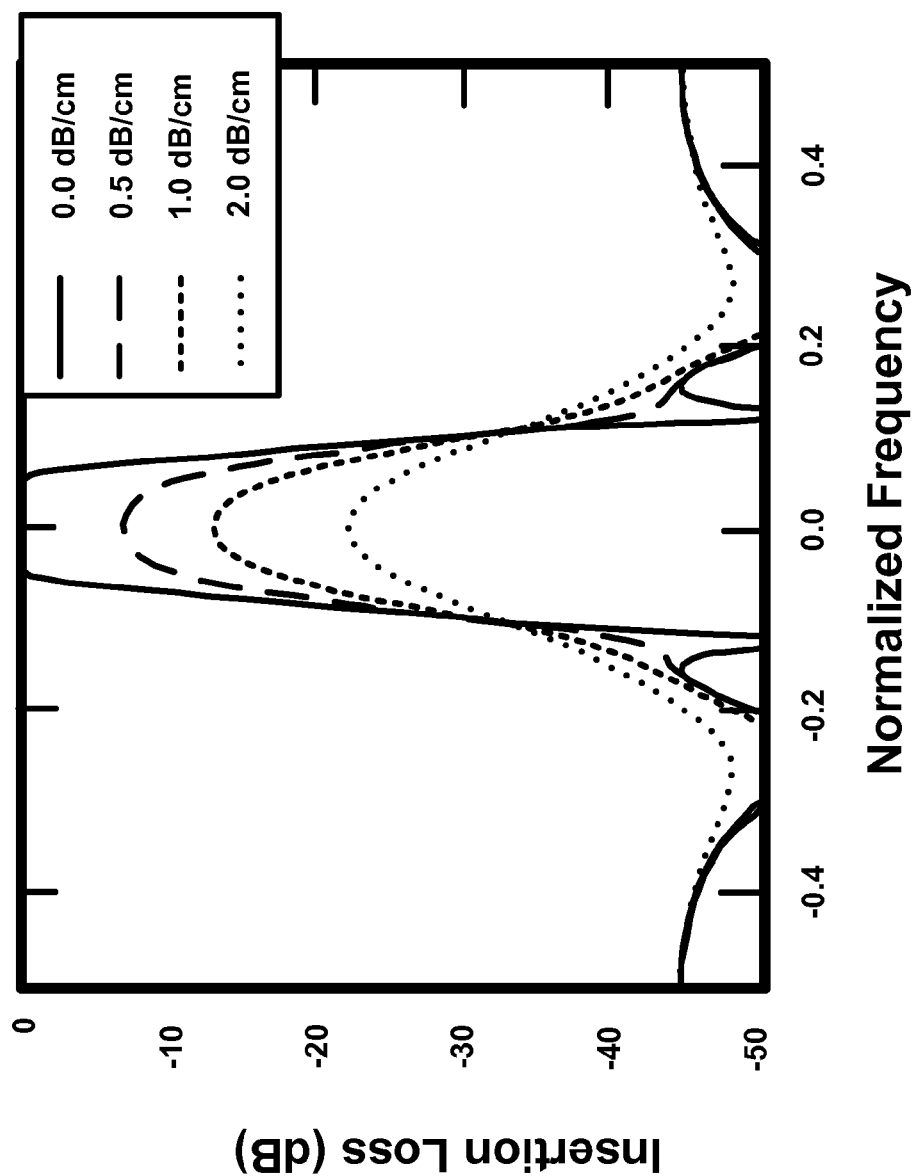
FIG. 2 is a graph of Insertion Loss vs. Normalized Frequency showing the impact of loss on the in-band loss and filter shape.

While such a prior art filter configuration like that shown in FIG. 1 does achieve a somewhat narrow, box-like response with an arrangement of relatively low order (in this example $6^{th}$ order) it unfortunately is susceptible to waveguide losses as sharp ring resonance group delay responses are required (large $Q=d\lambda/\lambda$, where Q is the amount of optical power within an individual ring). Such an understanding may be appreciated with reference to FIG. 2, which shows a graph of Insertion Loss (dB) vs. Normalized Frequency and illustrates the impact of loss on the in-band loss and filter shape. The data used in this FIG. 2 is that for a $4^{th}$ order filter and 10% passband. As can be readily appreciated, loss has a significant impact on the passband.

Advantageously, and according to the present invention, two pole/zero filters may be concatenated such that an ultra-narrow passband frequency response is realized—without the attendant loss which plagues the prior art. More particularly, the frequency response of each of the two filters that comprise the overall apparatus overlap nominally less than 50% at each side of the desired passband. Consequently, by varying the component filters that comprise the apparatus, nearly any required frequency slice may be produced. In this manner, the resulting passband is the multiplication of the two filter responses.

Figure 3:
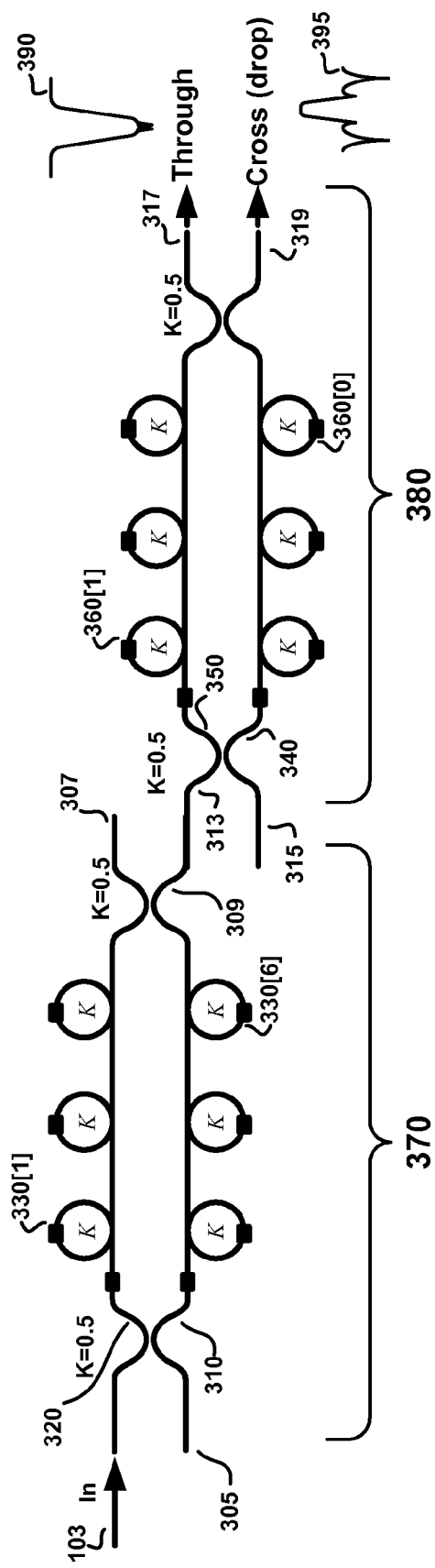
FIG. 3 is a schematic diagram of a cascaded filter according to the present invention.

Turning now to FIG. 3, there is shown a concatenated filter 300 according to the present invention comprising two individual multiple-order filters 370, and 380. The first filter 370, includes one or more input waveguides 303, 305 and one or more output waveguides 307, 309 optically connected respectively by a pair of waveguide arms 320, and 310. Accordingly, an optical signal applied to an input waveguide will exit through an output waveguide after traversing the apparatus via upper arm 320 and/or lower arm 310. Finally, the first filter 370 includes a plurality of ring resonators 330[1] . . . 330[6], certain ones of which are optically coupled to either the upper arm 320 or the lower arm 310 of the filter.

The second filter 380 is similarly configured and includes one or more input waveguides 313, 315 and one or more output waveguides 317, 319 optically connected respectively by a pair of waveguide arms 350, and 340. As such, an optical signal applied to an input waveguide will exit through an output waveguide after traversing the apparatus via upper arm 340 and/or lower arm 350. Like the first filter 370, this second filter 380 includes a plurality of ring resonators 360[1] . . . 360[6], certain ones of which are optically coupled to either the upper arm 350 or the lower arm 340 of this second filter.

The filters 370, 380 are concatenated such that an output waveguide 309 of the first filter 370 is optically connected to an input waveguide 313 of the second filter 380. Of course those skilled in the art will appreciate that this optical connection is merely exemplary, and alternatively the other output of the first filter may be connected to the other input of the second filter.

As can be observed from FIG. 3, an optical signal entering the first filter 370 is output at an output waveguide 309 and then introduced into an input waveguide 313 of the second filter 380. Advantageously, filtered through signals 390 are output at output waveguide 317 while filtered cross (drop) signals 395 are output at output waveguide 319. Those skilled in the art will quickly recognize the advantages associated with having both through and drop signals available at outputs of a single filter structure wherein the through signals are those output signals which fall within the passband of the overall cascaded filter and the drop signals are those output signals which fall outside of the passband of the overall cascaded filter.

Figure 4:
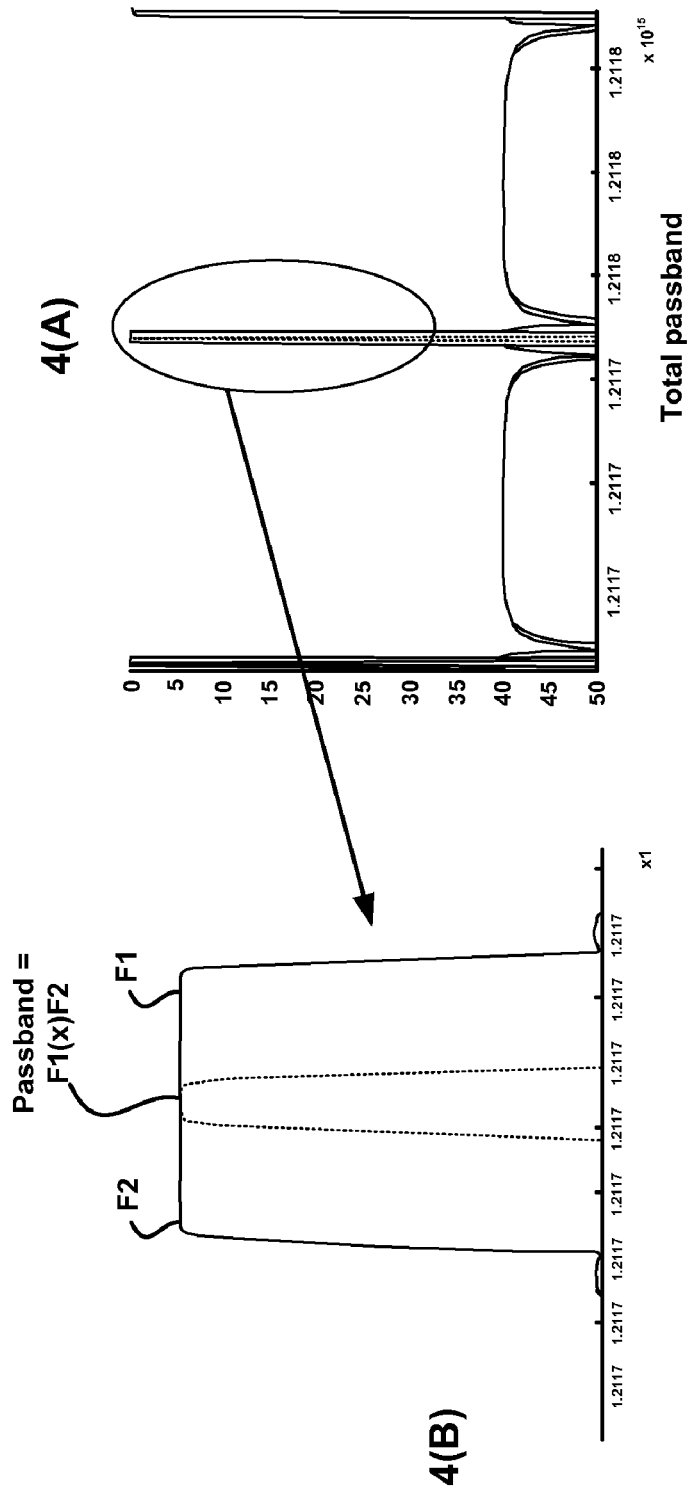
FIG. 4 is a graph depicting the total filter response as a function of multiplication of each filter frequency response.

This concatenated configuration results in the interleaving of the frequency responses of the individual filters. As noted earlier, in a preferred embodiment, the frequency response of each of the individual filters overlaps the desired passband by an amount substantially 50%. As depicted in FIG. 4, when such overlap is achieved, the filter response of the concatenated structure is the multiplication of each of the individual filters.

More specifically, 4(A) shows a graph of the total passband relative to the narrow passband of the present invention (Circled Region). The narrow passband is shown in a more detailed graph in 4(B), showing the relationship between the narrow passband of the cascaded filter of the present invention, relative to the passband(s) of component filters F1 and F2. Finally, 4(C) shows diagrammatically that the overall response of a filter constructed according to the present invention is a multiplication of the two component filters F1 and F2, wherein PassBand=F1(x)F2.

To configure the concatenated filter, each individual filter passband response is configured separately. As can be appreciated, the filter passband for each may be set to allow a relatively wide range of frequencies which—in turn—minimize filter loss.

Subsequently—and according to the present invention—an individual filter passband is overlapped by the other filter's passband (See, e.g., FIG. 4(B)). The width of the overlap determines the width of the desired cascaded filter frequency response, i.e., passband.

As can now be appreciated, a particular advantage of the present invention is the relief if waveguide loss constraints are needed in a single stage filter. Also, the total optical power throughput is significantly improved and therefore improves the signal to noise ratio of the device. In addition, a broad range of passband widths may be implemented without introducing variation of the filter access loss. Finally, any crosstalk associated with neighboring channels is significantly reduced.

It should be noted that if a narrow passband such as that according to the instant invention were attempted using a single MZ structure, extremely high Q values for the resonators (~>100,000) would be required. In addition, very low loss ring resonators would be required as well.

In contrast, devices constructed according to the present invention substantially relax these requirements thereby enhancing their reproducibility, manufacturing ease, and relatively low cost. More particularly, Q values substantially less than the 100,000 previously mentioned are effective with the present invention. In fact, Q values on the order of 20,000–50,000 are particularly useful and effective. A particular advantage of the instant invention is that the overall passband may be changed—without changing the individual Q characteristics of the individual resonators.

In addition, while the present invention has been shown and described using an exemplary number of ring resonators (i.e., 3 in each arm of an individual MZ structure) those skilled in the art will appreciate that the number of resonators may be varied, depending upon the particular passband requirements. In particular, as few as three (3) resonators total or as many as ten (10) for each MZ structure are useful for foreseeable applications. Of course, when the total number of resonators in a MZ structure is an odd number, then the MZ structure is "unbalanced"—that is there is an unequal number of resonators in each of the arms comprising the particular MZ structure. Lastly, the number of resonators in the two cascaded filters comprising the overall apparatus need not be equal as well. Consequently, the present invention is quite flexible in its implementation and application.

Finally, and a particular advantageous aspect of the present invention, is that it may be constructed from a variety of known materials including, but not limited to Silicon, Lithium Niobate, etc. More particularly, it may be constructed from any material having a core index which is different from a cladding index—or even where the "cladding index" is provided by air or other environmental ambient.

At this point, while the present invention has been shown and described using some specific examples, those skilled in the art will recognize that the teachings are not so limited. Accordingly, the invention should be only limited by the scope of the claims attached hereto.

What is claimed is:

1. An optical filter comprising:
   a first Mach-Zehnder optical structure including
       a pair of arms each one of which having an input port and an output port and an optical waveguide optically interconnecting the input port to the output port;
   a second Mach-Zehnder optical structure including
       a pair of arms each one of which having an input port and an output port and an optical waveguide optically interconnecting the input port to the output port;
   CHARACTERIZED IN THAT:
   one of the output ports of the first Mach-Zehnder structure is optically connected to an input port of the second Mach-Zehnder structure;
   each arm of both Mach-Zehnder optical structures includes one or more resonators optically coupled thereto; and
   upon application of an input optical signal to one of the input ports of the first Mach-Zehnder structure, a THROUGH output signal is available at one of the output ports of the second Mach-Zehnder structure and a DROP output signal is available at the other output port of the second Mach-Zehnder structure.

2. The optical apparatus of claim 1 further CHARACTERIZED IN THAT:
   the first and second Mach-Zehnder structures have an equal number of resonators.

3. The optical apparatus of claim 1 further CHARACTERIZED IN THAT:
   at least one of the Mach-Zehnder structures has an odd number of resonators.

4. The optical apparatus of claim 1 further CHARACTERIZED IN THAT:
   at least one of the Mach-Zehnder structures has an even number of resonators.

5. The optical apparatus of claim 1 further CHARACTERIZED IN THAT:
   the resonators exhibit a Q value of less than 100,000.

6. The optical apparatus of claim 1 further CHARACTERIZED IN THAT:
   one or more of the resonators exhibits a Q value which is substantially different from one or more of the other resonators.

7. The optical apparatus of claim 1 further CHARACTERIZED IN THAT:
   the passband characteristics of the overall filter is adjustable without changing the Q value of an individual resonator.

8. The optical apparatus of claim 1 further CHARACTERIZED IN THAT:
   the Q value of each of the resonators is greater than 20,000 and less than 100,000.

* * * * *